United States Patent [19]

Kadota et al.

[11] Patent Number: 4,491,371

[45] Date of Patent: Jan. 1, 1985

[54] HYDRAULIC PRESSURE CONTROL VALVE FOR AUTOMOBILE BRAKE MECHANISM

[75] Inventors: Shinkichi Kadota; Tsuyoshi Yamase, both of Hamamatsu, Japan

[73] Assignee: Rhythm Motor Parts Manufacturing Company Limited, Hamamatsu, Japan

[21] Appl. No.: 375,117

[22] PCT Filed: Sep. 3, 1981

[86] PCT No.: PCT/JP81/00215

§ 371 Date: May 3, 1982

§ 102(e) Date: May 3, 1982

[87] PCT Pub. No.: WO82/00804

PCT Pub. Date: Mar. 18, 1982

[30] Foreign Application Priority Data

Sep. 3, 1980 [JP] Japan .................................. 121871
Jun. 8, 1981 [JP] Japan .................................. 83748

[51] Int. Cl.$^3$ ............................................. B60T 13/00
[52] U.S. Cl. ...................................... 303/6 C; 188/349
[58] Field of Search ............. 188/349; 303/6 C, 84 A, 303/84 R

[56] References Cited

U.S. PATENT DOCUMENTS 4,311,345  6/1982  Schopper ........................... 303/6 C Primary Examiner—Bruce H. Stoner, Jr.
Assistant Examiner—Alvin Oberley
Attorney, Agent, or Firm—Sughrue, Mion, Zinn, Macpeak, and Seas

[57] ABSTRACT

A hydraulic pressure control valve for an automobile brake mechanism which is provided with a first hydraulic pressure passage communicating with each brake units of, for instance, front wheels, and a second hydraulic pressure passage communicating with each brake units of, for example, rear wheels, and in which a plunger 5 is disposed in at least one or both of the hydraulic pressure passages and at least one hydraulic pressure regulating mechanism for converting the hydraulic pressure of a brake liquid as desire for instance, a poppet valve 14, is provided in association with the plunger in the hydraulic pressure passage having disposed therein the plunger, and in which blocking member is provided for inhibiting the plunger 5 from moving in a direction in which to cut off the brake liquid when the hydraulic pressure of either one of the hydraulic pressure passages fails. The blocking member is composed of a moving member 10 moved by a difference in pressure between the both hydraulic pressure passages and a pressurizing member 17 for generating a pressure on the plunger by the movement of the moving member.

7 Claims, 13 Drawing Figures

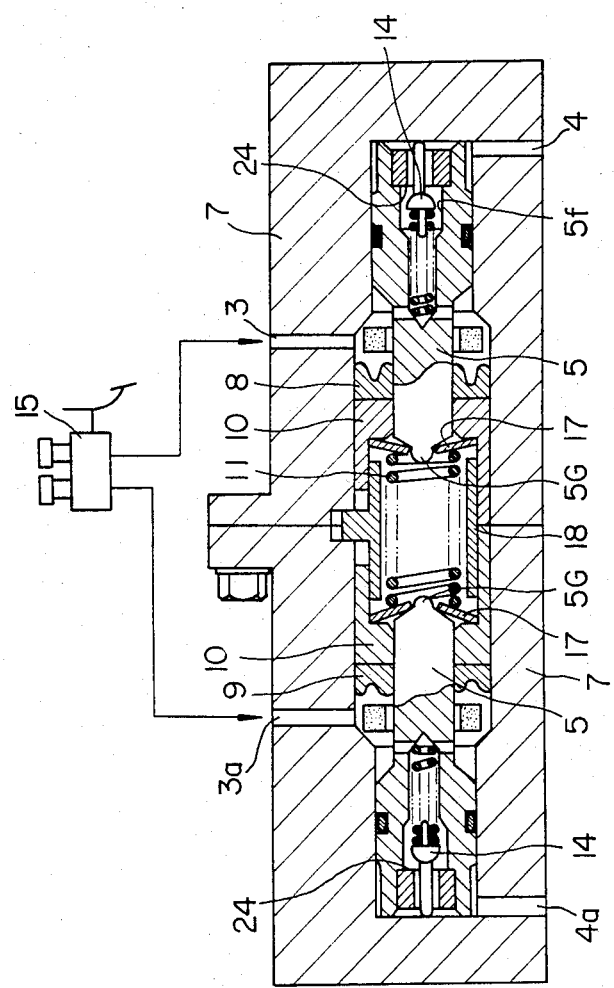

HYDRAULIC PRESSURE CONTROL VALVE FOR AUTOMOBILE BRAKE MECHANISM

FIELD OF THE INVENTION

The present invention relates to a hydraulic pressure control valve for an automobile brake mechanism, and more particularly to a hydraulic pressure control valve which is disposed in an automobile braking system between its master cylinder and brake units to regulate a braking force for brakes of front and rear wheels. This invention is especially applicable for the rear brake units which is not equipped with a y-seal subject to hydraulic pressures from both sides thereof, unlike in the prior art, but are capable of partly restoring a braking force by inhibiting a plunger from moving in a direction in which to cut off a brake liquid upon failure of a liquid passage leading to each brake unit of either the front or rear wheels.

BACKGROUND OF THE INVENTION

In an automobile speed control mechanism, a braking force is usually converted by a hydraulic braking system into a hydraulic pressure of a brake liquid for transmission to each brake unit. With the hydraulic braking system, a force applied thereto from a brake pedal during braking is converted by a master cylinder into hydraulic pressure, which is further converted to hydraulic pressure suitable for the braking force of each of front and rear wheels and then transmitted to a wheel cylinder of each wheel to actuate its brake unit, thus braking the wheel.

For reducing the speed of an automobile, a large braking force is needed; in addition, its deceleration is limited by a value dependent upon an adhesion coefficient between tires and the ground. It is required that the braking force for the front and rear wheels be properly distributed by selecting a maximum oil pressure on a rear wheel brake smaller than on a front wheel brake. It is well-known in the art that an ideal distribution of the braking force for the front and rear wheels is such that the front brake gradually works with an increase in the braking force therefor, that is, the individual braking forces for the front and rear wheels bear such a relation as is represented by a quadratic curve. But the braking forces for the front and rear wheels are usually fixed, or bear a constant relation to each other, and a variety of hydraulic pressure control valves are employed for achieving such an ideal distribution of the braking force.

With such hydraulic pressure control valves, an input oil pressure from the master cylinder is usually transmitted, as it is, to the brake unit of, for example, the front wheel, whereas, to the brake unit of the rear wheel, the input oil pressure is applied after being reduced by a reciprocating motion of a plunger. These prior art valves are defective as discussed below. FIGS. 1(a) and (b) are a cross-sectional view of a conventional hydraulic pressure control valve and an enlarged view of one portion. As shown in FIG. 1, a valve proper 7 has formed therein brake liquid inlet ports 1 and 3 and outlet ports 2 and 4. A liquid passage from the inlet port 1 to the outlet port 2 constitutes a first hydraulic pressure passage leading to each brake unit of the front wheel, for instance, and a liquid passage from the inlet port 3 to the outlet port 4 constitutes a second hydraulic pressure passage leading to the brake unit of the front wheel, for example. In the central portion of the valve proper 7 is made a stepped hole 12a, in which a stepped plunger 5 is provided so that it may freely reciprocate. One end 5a of the plunger 5 partly extends into the first hydraulic pressure passage separated by a y-seal 6 from the second hydraulic pressure passage.

The other end 5b of the plunger 5 lies in the second hydraulic pressure passage, and a valve flange 5c of a larger diameter than that of the other end 5b is formed between the one end 5a and the other end 5b of the plunger. Further, a spring receiving flange 5d is formed in contact with the valve flange 5c, defining therebetween a circular space 5e. A spring 7a is supported by the spring receiving flange 5d and, by a plug 12 threadably engaged with the valve proper, the spring 7a is urged toward the first hydraulic pressure passage, resulting in the plunger 5 being urged by the resiliency of the spring 7a toward the first hydraulic pressure passage.

Between the two flanges 5c and 5d, that is, in the circular space 5e, is disposed a lip seal 23 made of a resilient material. The lip seal 23 has its outer peripheral surface making contact with the interior surface of the stepped hole 12a and its inner peripheral surface projecting into the circular space 5e between the two flanges 5c and 5d as depicted in FIG. 1(b). The lip seal 23 has formed integrally therewith semi-spherical projections 23a at predetermined intervals on the side of the spring receiving flange 5d. During normal drive operation, as shown in FIGS. 1(a) and (b), the projections 23a of the lip seal 23 are in contact with the spring receiving flange 5d and the brake liquid flowing into the stepped hole 12a from the inlet port 3 is drained out from the outlet port 4, passing through gaps defined between adjacent ones of the semi-spherical projections 23a. In the second hydraulic pressure passage, since the cross-sectional areas of the plunger 5, i.e. its other end 5b and the valve flange 5c are selected different from each other, the brake liquid having entered from the inlet port 3 is drained out, with its hydraulic pressure regulated by the engagement of the lip seal 23 with the outer peripheral surface of the valve flange 5c. That is to say, the plunger 5 lies between the first and second hydraulic pressure passages and reciprocates in dependence upon the force of the spring 7a and the hydraulic pressure of the brake liquid in the first hydraulic pressure passage, by which the hydraulic pressure of the brake liquid is regulated in the second hydraulic pressure passage. Between the first and second hydraulic pressure passages is disposed the Y-seal 6 and, during normal operation, the plunger 5 is urged toward the second hydraulic pressure passage. Accordingly, when the first hydraulic passage fails, the pressure on the plunger 5 decreases by that and the the pressure regulated in the second hydraulic pressure passage increases, resulting in the hydraulic pressure on the side of the outlet port 4 to be regulated as shown in FIG. 3, line (b). The Y-seal 6 is always exposed to the hydraulic pressures in the first and second hydraulic pressure passages and, in addition, the plunger 5 reciprocates, so that the Y-seal 6 held in contact with it is liable to be broken.

The present invention has for its object to cure the abovesaid defect; in concrete terms, the invention is to provide a hydraulic pressure control valve designed so that during normal operation no external forces are applied to the plunger, and that upon failure of either one of the hydraulic pressure passages leading to the brake units of the front and rear wheels, sliding movement of the plunger is inhibited, thereby to hold the hydraulic pressure regulating mechanism inoperative.

DISCLOSURE OF THE INVENTION

The present invention is characterized first in that a first hydraulic pressure passage communicating with a brake unit of either one of front and rear wheels and a second hydraulic pressure passage communicating with brake units of the other are provided; a plunger is disposed in at least the second hydraulic pressure passage; at least one hydraulic pressure regulating mechanism is provided on the plunger in the second hydraulic pressure passage; and blocking means is provided for inhibiting the plunger from moving in a direction in which to cut off the brake liquid.

Accordingly, when the first or second hydraulic pressure passage communicating with each brake unit fails, the blocking means operates, permitting the hydraulic pressure to rise without the brake liquid being cut off by the hydraulic pressure regulating mechanism. As a result of this, each brake unit on the side of the second hydraulic pressure passage, for instance, are supplied with an increased braking force.

Secondly, the present invention is characterized in that second hydraulic pressure passages to the hydraulic pressure of either one of them, and a pressurizing member for generating, by the movement of the moving member, a pressure on the plunger from at least one of the directions radial and axial thereof and oblique thereto.

Accordingly, the blocking means is composed of only the moving member and the pressurizing member, and hence is extremely simple structured. During normal operation, the pressurizing member is not subject to any external forces unlike the Y-seal shown in FIG. 1(a). Upon failure of either one of the hydraulic pressure passages, the moving member detects it and moves and, by this movement, the pressurizing member applies a pressure to the plunger to retain it, that is, the movement of the plunger is immediately inhibited, so that the brake liquid is not cut off by the hydraulic pressure regulating mechanism of the plunger.

Thirdly, the present invention is characterized in that the moving member is constituted as a member which conforms to the outer peripheral surface of the plunger with a slight gap defined therebetween; the moving member has on its inner peripheral surface a pressurizing area for urging the pressurizing member in its axial direction; the pressurizing member is a member which conforms to the outer peripheral surface of the plunger with a slight gap defined therebetween; and the pressurizing member is formed of rubber, synthetic resin or like elastic material.

Accordingly, it is sufficient that the moving member has the pressurizing area. The pressurizing member is made of rubber, synthetic resin or like elastic material, so that when pressed by the pressurizing area of the moving member, it generates a large pressurizing force for the plunger, ensuring to inhibit the movement of the plunger.

Fourthly, the present invention is characterized in that the blocking means comprises a pair of moving members which are moved by the difference in pressure between the first and second hydraulic pressure passages and are disposed adjacent each other, a pressurizing member which is urged by the movement of the moving members to develop a pressurizing force in the axial direction of the plunger, and a stopper member which supports the pressuring member.

Accordingly, the pressurizing member generates a force acting on the plunger in its axial direction to prevent its movement, ensuring to obstruct the movement of the plunger with certainty. Further, by interposing at least one pressurizing member between the pair of moving members, this type of hydraulic pressure control valve can also be applied to a dual type hydraulic pressure control valve and, further, it can be formed as a unitary structure with the master cylinder. Especially in the case of such a unitary structure, a support shaft inserted into a shaft receiving hole is extended into the master cylinder to hold the stopper member, by which it can be also used as a stopper of the master cylinder.

BRIEF DESCRIPTION OF THE DRAWINGS

FIG. 6 is a cross-sectional view showing the application of blocking means of the hydraulic pressure control valve of FIG. 4 to a dual type hydraulic pressure control valve;

DESCRIPTION OF THE PREFERRED EMBODIMENTS

Figure 1A:
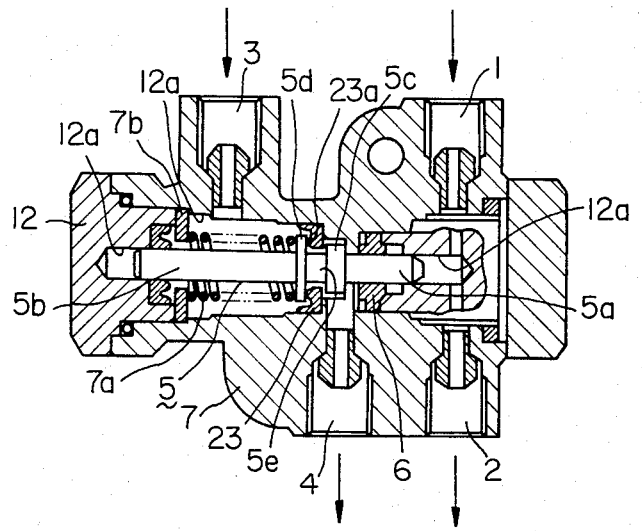
FIG. 1(a) is a cross-sectional view of a conventional hydraulic pressure control valve.
Figure 1B:
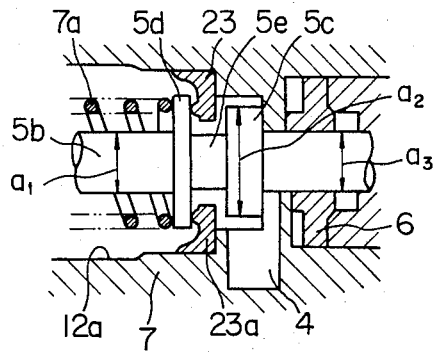
FIG. 1(b) is an enlarged cross-sectional view of its one portion.
Figure 2A:
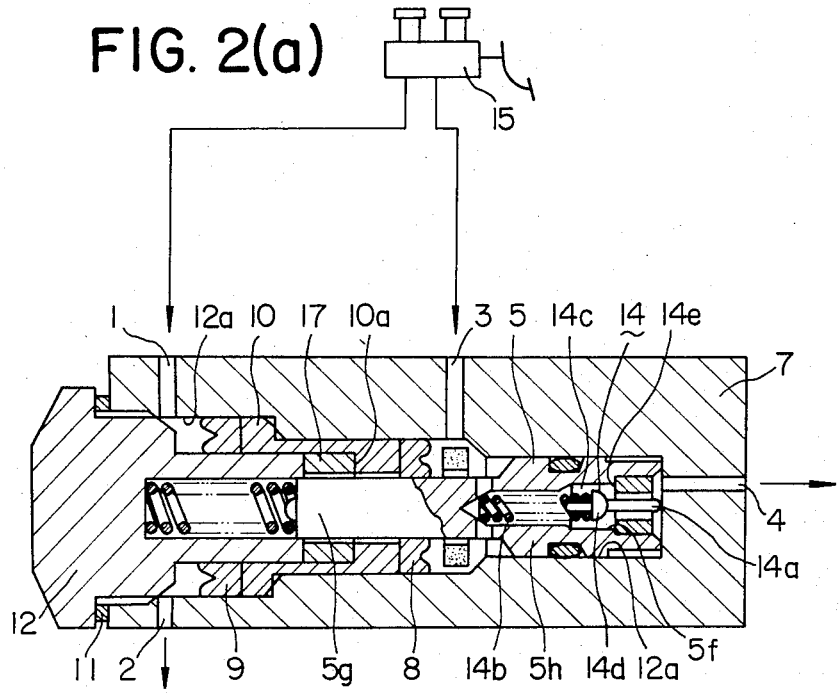
FIG. 2(a) is a cross-sectional view of a hydraulic pressure control valve according to an embodiment of the present invention.

In FIG. 2(a), reference numerals 1 and 3 indicate inlet ports and numerals 2 and 4 designate outlet ports; 5 identifies a plunger; and 7 denotes a valve proper. A portion of a brake liquid fed from a master cylinder 15 enters into the valve proper 7 from the inlet port 1 and is drained out from the outlet port 2 forming a first hydraulic pressure passage, which usually communicates with brake units of the front wheels. The other remaining portion of the brake liquid from the master cylinder 15 enters into the inlet port 3 and is drained out from the outlet port 4 and, in this time, forming a second hydraulic pressure passage, which usually communicates with brake units of rear wheels. Accordingly, the pressure of the brake liquid passing through the first hydraulic pressure passage is transmitted to each brake unit of the front wheels at a value set by the master cylinder 15, whereas, in the second hydraulic pressure passage, the hydraulic pressure is controlled as required, by the action of a poppet valve 14 described later and this controlled hydraulic pressure is transmitted to each brake unit of the rear wheels.

The first and second hydraulic pressure passages form a shaft receiving hole 12a extending along the center axis of the valve proper 7, the shaft receiving hole 12a being shielded by two seal members 8 and 9 from the outside. As shown in FIG. 2, the shaft receiving hole 12a is usually a stepped hole and the plunger 5 is inserted into the shaft receiving hole 12a. The rear end of the plunger 5 has mounted thereon a spring 11, which is threadably engaged with a plug 12 to press it. The plunger 5 has a small-diameter portion 5g and a large-diameter portion 5h, and the stepped plunger is snugly fit into the stepped shaft receiving hole 12a.

An insertion hole 14c is formed in the large-diameter portion 5h of the plunger to extend along its center axis and, in this insertion hole 14c, a hydraulic pressure regulating mechanism such, for instance, as a poppet valve 14, as usual, a valve rod 14a projects out from a semispherical valve body 14d and a spring 14b is loaded on the back of the valve body 14d and, further, a valve seat 14e is formed by the shoulder portion of the insertion hole 14c, the valve body 14d and the valve seat 14e constituting an openclose valve. Consequently, in the second hydraulic pressure passage, the brake liquid having entered from the inlet port 3 flows into the insertion hole 14c of the plunger and when the hydraulic pressure in that portion exceeds a set pressure determined by the spring 11, the plunger 5 moves toward the first hydraulic pressure passage, the consequence of which the brake liquid is cut off between the valve body 14d and the valve seat 14e, permitting the brake liquid to flow out from the outlet port 4 at a desired hydraulic pressure.

Between the first and the second hydraulic pressure passages is provided blocking means for inhibiting the movement of the plunger 5 through utilization of a difference in hydraulic pressure between the first and second hydraulic pressure passages, for instance, when the hydraulic pressure of the first hydraulic pressure passage fails. The blocking means comprises a moving member 10 moving substantially in parallel to the center axis of the plunger 5 and a pressurizing member 17 which is pressed by the moving member 10. The moving member 10 comprises a cylindrical form surrounding the plunger 5, with a small gap defined therebetween, and it has a shoulder portion 10a on its inner surface, which portion 10a serves as a pressurizing area to press the pressurizing member 17. The pressurizing member 17 is usually formed to surround the plunger 5, with a small gap defined therebetween. The pressurizing member is usually made of rubber, synthetic resin or like elastic material and is held between a stopper such as the plug 12 and the moving member 10.

Figure 3:
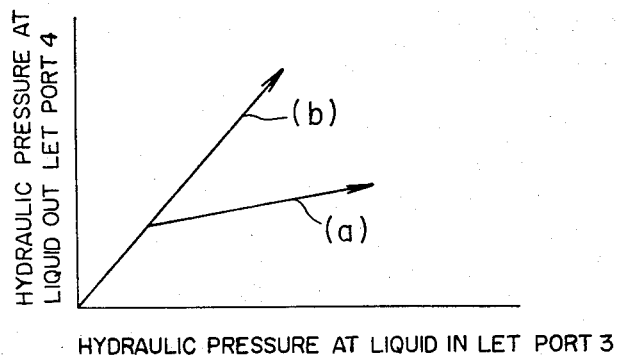
FIG. 3 is a graph showing the operation characteristic of the hydraulic pressure control valve illustrated in FIG. 2(a)

Accordingly, for example, when the hydraulic pressure of the first hydraulic pressure passage fails due to accident, the movement of the plunger 5 is inhibited by the pressurizing member 17 and the poppet valve 14 is held open, so that the characteristic shown in FIG. 3, line (b) is obtained and the brake liquid is not cut off. Therefore, the hydraulic pressure of the characteristic shown in FIG. 3, line (b) is transmitted to each brake unit of the rear wheels, performing a braking action without a hitch.

Figure 2B:
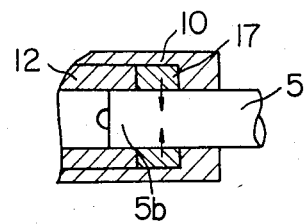
FIG. 2(b) is explanatory of how a pressurizing force acts on a plunger in the case of inhibiting its movement by a pressurizing member.

In other words, when the hydraulic pressure fails in the first hydraulic pressure passage, the moving member 10 is moved toward the first hydraulic pressure passage by the difference in pressure between the first and second hydraulic pressure passages and the pressurizing member 17 is pressed and compressed between the pressurizing area 10a of the moving member and the plug 12. In this state, since the pressurizing member 17 is made of rubber, synthetic resin or like elastic material, it is pressed in a direction substantially parallel to the plunger 5 and as shown in FIG. 2(b), a force A is developed toward the center of the plunger 5 in the radial direction thereof, holding the plunger 5 from its outer periphery to obstruct its movement. In consequence, as depicted in FIG. 3, line (b), the hydraulic pressure is increased and the brake liquid of this pressure is supplied to, for instance, the brake units of the rear wheels.

Incidentally, the pressurizing surface of the pressurizing member 17 may also be roughed or grooved to provide for increased coefficient of friction.

Furthermore, it is also possible to form the pressurizing member 17 by a plate-like member, instead of such a circular form as mentioned above, so that it may engage with the rear end portion of the plunger 5.

Figure 4:
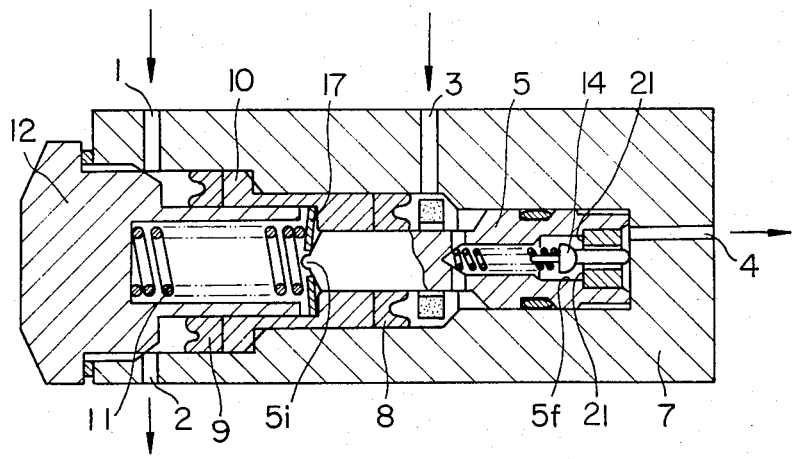
FIG. 4 is a cross-sectional view of a hydraulic pressure control valve according to another embodiment of the present invention.
Figure 5A:
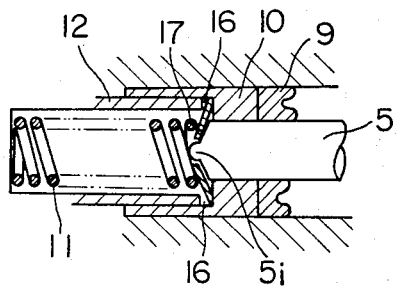
FIGS. 5(a) and 5(b) are explanatory illustrations of the operation for inhibiting the movement of the plunger by pressing it with a pressurizing member in the hydraulic pressure control valve shown in FIG. 4.
Figure 5B:
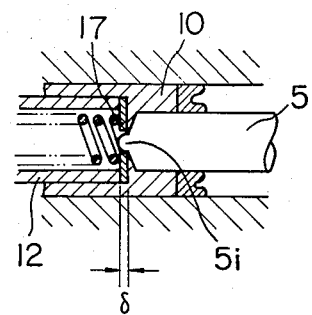

That is to say, as illustrated in FIG. 4, the pressurizing member 17 is made in a disc-like form, which has a centrally-disposed opening and is mounted with the opening receiving a projection 5i of the rear end portion of the plunger 5. A portion of the pressurizing member 17, usually its marginal portion, is inserted into a gap 16 between the moving member 10 and the stopper member such as the plug 12. Even with such an arrangement, during normal operation the hydraulic pressure control valve is in such a state as depicted in FIG. 5(a) and no pressure acts on the plunger 5. But, when the hydraulic pressure fails in the first hydraulic pressure passage, the moving member 10 starts to move to left on the drawing as shown in FIG. 5(b) and, by compression between the moving member 10 and the plug 12, the pressurizing member 10 develops a force toward the axial direction of the plunger 5 to prevent its movement.

The arrangement of the present invention is applicable not only to the pressure control valve of the above-described type but also to such a dual type pressure control valve as shown in FIG. 6. In this type of pressure control valve, for instance, the second hydraulic pressure passage leading to each brake unit of the rear wheels is divided into two, the one passage being formed between the inlet port 3 and the outlet port 4 and the other passage being formed between an inlet port 3a and an outlet port 4a, and the plunger 5 is disposed in each of the two passages. A disc-shaped pressurizing member 17 is engaged with the end face of each plunger 5 and the circumferential portion of each pressurizing member 17 is pressed by each moving member 10 on either side of a central stopper member 18. In the case of constituting the pressurizing member 17 in such a disc-like or plate-like form as described above, it may be formed as one body or an assembly of divided pieces.

Figure 7A:
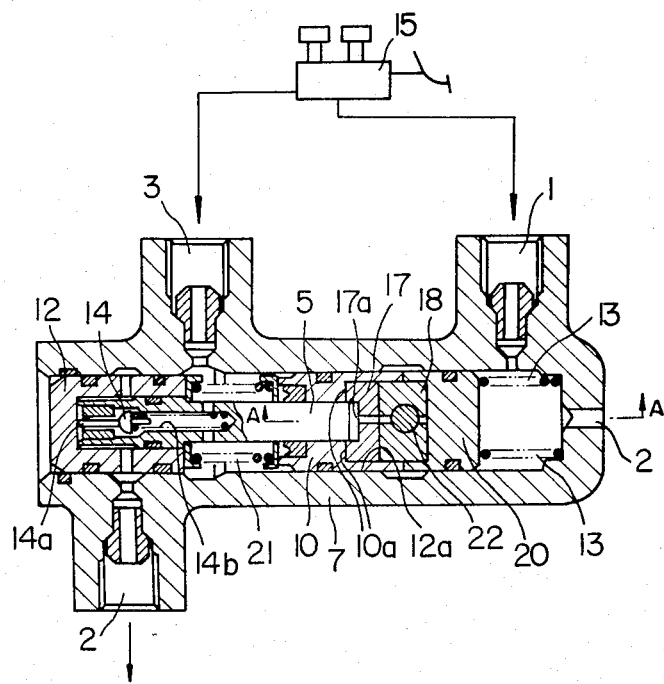
FIG. 7(a) is a cross-sectional view of a hydraulic pressure control valve according to another embodiment of the present invention.

For pressing the end face of the plunger 5 by the pressurizing member 17 to prevent its movement, it is also possible to employ such arrangements as shown in FIGS. 7(a), (b), (c) and 8.

In a hydraulic pressure control valve depicted in FIG. 7(a), the first hydraulic pressure passage is established between the inlet port 1 and the outlet port 2, and the second hydraulic pressure passage is formed between the inlet port 3 and the outlet port 4. The plunger 5 is disposed in the second hydraulic pressure passage and the poppet valve 14 is mounted as a hydraulic pressure regulating mechanism on the tip of the plunger 5.

That is to say, the shaft receiving hole 12a is formed in the valve proper 7 to extend along its axis; the open end of the shaft receiving hole 12a is closed by the plug 12; the first and second hydraulic pressure passages are set up on both sides of a pair of moving members 10 and 20; and the plunger 5 is disposed in the second hydraulic pressure passage. In the second hydraulic pressure passage, the hydraulic pressure of the brake liquid is controlled by opening and closing of the poppet valve 14 at the tip of the plunger 5. Between the pair of moving members 10 and 20 is disposed the stopper member 18. The stopper member 18 need not always be fixed but it may be secured to the valve proper 7 by means of a shaft member 22. Between the stopper member 18 and the end face of the plunger 5 is interposed the pressurizing member 17 so that it may be pressed.

In this case, at least one of the moving members 10 and 20, for instance, the moving member 10 is constructed in a cylindrical form to surround the outer peripheral surface of the plunger 5 and the inner peripheral surface of the moving member 10 is formed to have a stepped portion, the shoulder portion of which is used as the pressurizing face 10a. Accordingly, when the pressurizing member 17 is compressed between the pressurizing face 10a and the stopper member 18, the movement of the plunger 5 toward the first hydraulic pressure passage can be prevented certainly and stably.

Figure 7B:
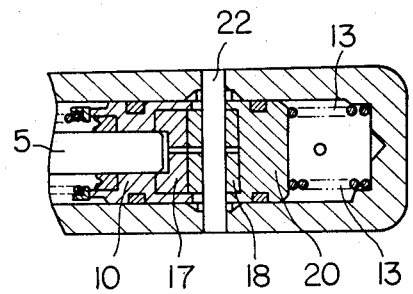
FIGS. 7(b) and 7(c) are cross-sectional views taken on the line A—A in FIG. 7(a), FIG. 7(c) showing an operation in the case of failure of a first hydraulic pressure passage.
Figure 7C:
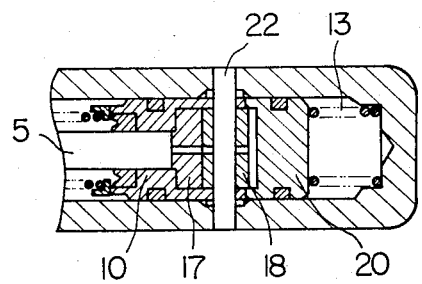

Namely, in the hydraulic pressure control valve shown in FIG. 7(a), the rear end face of the plunger 5 is supported by the pressurizing member 17 and the supporting portion of the pressurizing member has a supporting recess 17a, which is usually formed in a columnar configuration, using rubber or like elastic material. When the hydraulic pressure of the brake liquid is normal, the moving members 10 and 20 do not move and, as shown in FIG. 7(b), the rear end portion of the plunger 5 is snugly fitted into the supporting recess 17a and the plunger 5 is not urged by the pressurizing member 17. In contrast thereto, when the hydraulic pressure fails in the first hydraulic pressure passage owing to accident or by some cause, the difference between the hydraulic pressures in the first and second hydraulic pressure passages increases and the one moving member 10 moves toward the first hydraulic pressure passage. At this time, the pressurizing member 17 is compressed by the pressurizing face 10a of the moving member 10 and this compressive force is transmitted to the interior of the pressurizing member 17 to swell its supporting recess on a free surface as depicted in FIG. 7(c). As a result of this, the plunger 5 is pressed by the end face of the pressurizing member and inhibited from moving.

Further, the hydraulic pressure control valve of FIG. 7(c) can also be constituted as a dual type one by disposing the plunger 5 in the first hydraulic pressure passage, too, and providing a hydraulic pressure regulating mechanism such as the poppet valve 14 at the tip of the plunger, and this type of valve can be disposed in the master cylinder as a unitary structure therewith.

Figure 8:
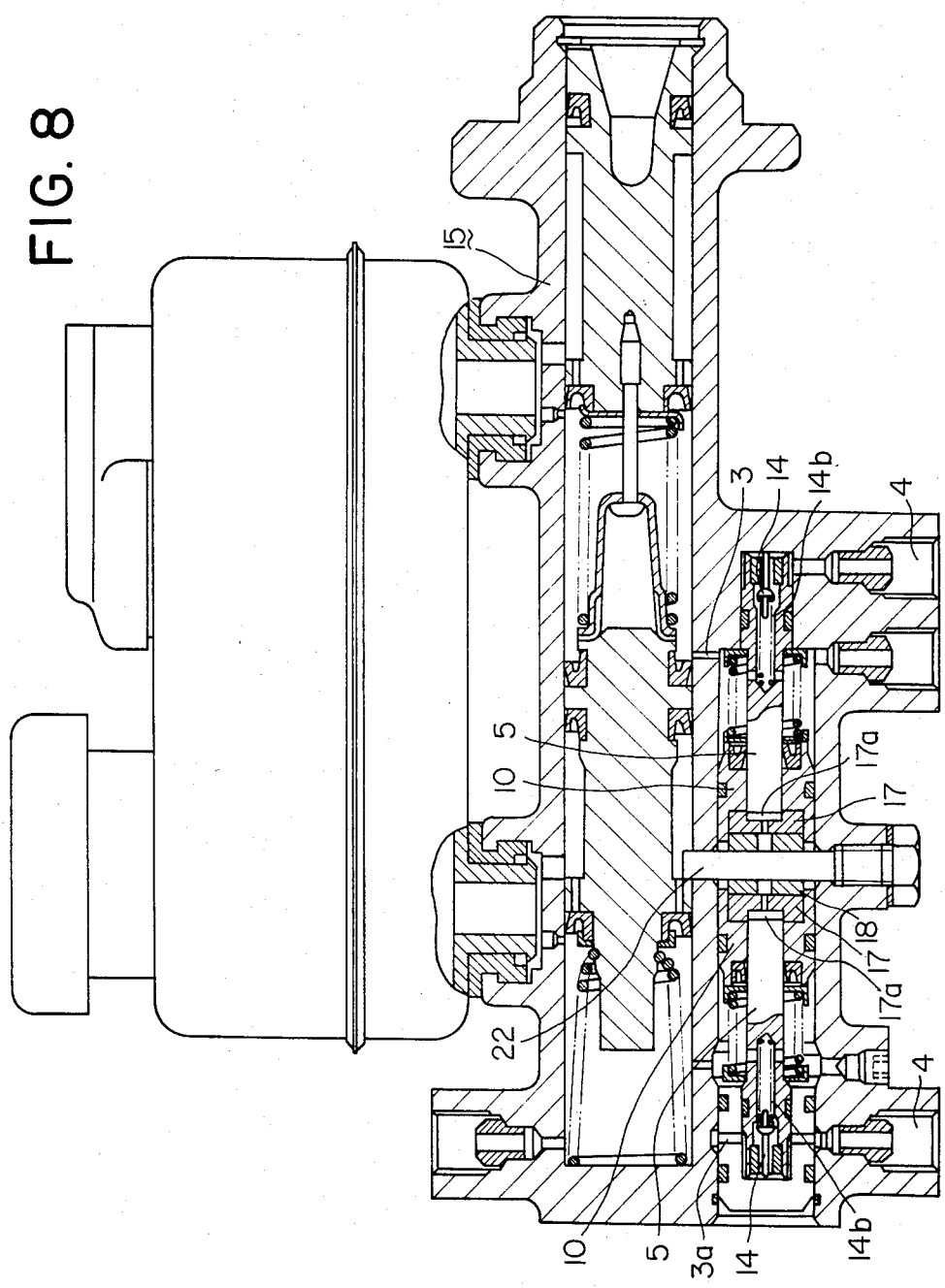
FIG. 8 is a cross-sectional view explanatory of the case where blocking means shown in FIG. 7(a) is applied to the dual type hydraulic pressure control valve and this type of hydraulic pressure control valve is formed as a unitary structure with a master cylinder.

That is to say, the master cylinder 15 shown in FIG. 8 is a tandem type one and the brake liquid is supplied to respective hydraulic pressure passages through two inlet ports 3a and 3. The plunger 5 is disposed in each hydraulic pressure passage to extend in its axial direction and, further, the poppet valve 14 is attached to the tip of each plunger 5. By the action of the poppet valve 14, the hydraulic pressure of the brake liquid is converted and is then transmitted to the brake unit of the rear wheels as usual. Also in this dual type of hydraulic pressure control valve, a columnar pressurizing member 17 is disposed opposite the rear end of each plunger and each pressurizing member 17 is held between each side of the stopper member 18 and each moving member 10. Further, the stopper member 18 can be fixed by, for example, a shaft member 22 to the casing of the master cylinder and, by extending the shaft member 22 into the master cylinder 15, it can also be utilized as a stopper for the piston of the master cylinder.

The foregoing description has been given mainly in connection with examples which employ the poppet valve as the hydraulic pressure regulating mechanism, but other kinds of hydraulic pressure regulating mechanisms can generally by used if they are to control the brake liquid to have a desired value of hydraulic pressure.

POSSIBILITY OF INDUSTRIAL UTILIZATION

As has been described in detail in the foregoing, according to the present invention, when the hydraulic pressure passage communicating with the brake units of either front or rear wheels fails through an accident or by some other cause in an automobile braking system, a portion of the braking force is recovered, ensuring safety driving. During normal driving, the pressurizing member is not subject to any external force, and hence is free from abrasive wear unlike the y-seal used in the prior art; accordingly, its durable length of time is markedly increased.

Furthermore, since the blocking means is composed of the moving member and the pressurizing member formed of rubber, synthetic resin or like resilient material, and hence it is extremely simple in structure and economical. And the blocking means can be employed not only in the automobile braking system but also in a hydraulic machine for regulating its pressure.

We claim:

1. A hydraulic pressure control valve for an automobile brake mechanism having a first hydraulic pressure passage communicating with each brake unit of one of front and rear wheels of the automobile, a second hydraulic pressure passage communicating with each brake unit of the other of said front and rear wheels, a plunger disposed in at least one of the hydraulic pressure passages and at least one hydraulic pressure regulating mechanism provided in association with the plunger, characterized in that said valve comprises:

a moving member moved by a difference in pressure between the first and second hydraulic pressure passages, said moving member being formed as a cylindrical member, and having an inner peripheral surface, said inner peripheral surface having a first portion conforming to the outer peripheral surface of the plunger with a small gap defined therebetween and said inner peripheral surface having a second portion separated from said first portion by a shoulder, said shoulder defining a pressurizing surface on said inner peripheral surface of the moving member;

a pressurizing member compressed by the movement of the moving member to apply pressure to the plunger;

and a stopper member for supporting the pressurizing member between the stopper member and the pressurizing surface of said moving member;

said pressurizing member being formed of an elastic material, so that when compressed by said stopper member and the pressurizing surface of said moving member, said pressure member exerts a large radial force on the plunger, thereby inhibiting the movement of the plunger.

2. A hydraulic pressure control valve for an automobile brake mechanism according to claim 1, characterized in that the pressurizing member is a circular member conforming to the outer peripheral surface of the plunger with a small gap defined therebetween.

3. A hydraulic pressure control valve for an automobile brake mechanism according to claim 1, wherein said valve is composed of a pair of moving members moved by a difference pressure between the first and second hydraulic pressure passages and disposed adjacent each other, a pressurizing member pressed by the movement of the moving members to apply a pressure to the plunger, and a stopper member for supporting the pressurizing member.

4. A hydraulic pressure control valve for an automobile brake mechanism according to claim 3, characterized in that at least one of the pair of moving members has a pressurizing surface for holding the pressurizing member between it and the stopper member.

5. A hydraulic pressure control valve for an automobile brake mechanism according to claim 3, characterized in that the pressurizing member is provided with a pressurizing portion adjacent one end of the plunger.

6. A hydraulic pressure control valve for an automobile brake mechanism according to claim 3, characterized in that the stopper member is fixed by a pin to a valve proper.

7. A hydraulic valve according to claim 3 wherein the pressurizing member is provided with a pressurizing portion opposite one end of the plunger.

* * * * *